United States Patent [19]

Plumridge et al.

[11] Patent Number: 4,590,112

[45] Date of Patent: May 20, 1986

[54] MULTI-LAYER ADHESIVE ARTICLES

[76] Inventors: Anthony E. C. Plumridge; Gillian M. Plumridge, both of 9 Sion Hill Place, Bath, Avon, BA1 5SJ, United Kingdom

[21] Appl. No.: 696,447

[22] Filed: Jan. 30, 1985

[30] Foreign Application Priority Data

Feb. 1, 1984 [GB] United Kingdom ............... 8402589
Oct. 2, 1984 [GB] United Kingdom ............... 8424784

[51] Int. Cl.[4] .......................... B32B 1/00; B32B 5/18; B32B 27/30
[52] U.S. Cl. ..................................... 428/71; 273/282; 273/290; 428/76; 428/159; 428/286; 428/318.6; 428/319.7; 428/409
[58] Field of Search ............... 428/159, 286, 290, 296, 428/318.6, 319.9, 409, 71, 76, 316.6, 318.8, 319.7; 273/282 A, 290

[56] References Cited

U.S. PATENT DOCUMENTS

| | | | |
|---|---|---|---|
| 2,585,924 | 2/1952 | Freedman et al. | 273/282 A |
| 2,875,115 | 2/1959 | Lott et al. | 428/290 |
| 3,540,977 | 11/1970 | Schickedanz | 428/318.6 |
| 3,836,151 | 9/1974 | Bowerman | 273/282 A |
| 4,400,422 | 8/1983 | Smith | 428/160 |
| 4,510,201 | 4/1985 | Takeuchi et al. | 428/318.6 |
| 4,543,289 | 9/1985 | Park | 428/318.6 |

FOREIGN PATENT DOCUMENTS

| | | | |
|---|---|---|---|
| 1307239 | 9/1962 | France | 428/319.7 |
| 1348883 | 3/1974 | United Kingdom | 428/319.7 |
| 1595794 | 8/1981 | United Kingdom | 428/316.6 |

*Primary Examiner*—William J. Van Balen
*Attorney, Agent, or Firm*—D. Peter Hochberg

[57] ABSTRACT

A multi-layer article having a padded appearance is disclosed. The article includes a layer of polished, highly plasticized polyvinyl chloride material suitable to adhere to a smooth high gloss surface and a padded layer. The article is produced by a high-frequency welding technique. Also disclosed are a combination of a substrate together with one or more of the multi-layer articles, and an article, in the form of a playbrick, having a padded appearance and being capable of adhering to smooth, high gloss surfaces including the surface of other such articles.

20 Claims, 6 Drawing Figures

MULTI-LAYER ADHESIVE ARTICLES

This invention relates to a multi-layer adhesive article and in particular to a multi-layer article which adheres to a smooth high gloss surface.

It is known, from German Patent Specifications Nos. 845441, 1286755 and 1179095, that smooth surfaces when pressed against each other, adhere to each other by the adhesive forces which are created between them.

British Pat. No. 627881 discloses a combination of a sheet having a highly glazed surface and characters in the form of flexible pieces of thin sheet polyvinyl chloride which self-adhere to the highly glazed surface.

U.S. Pat. No. 2,585,924 to Freedman et al relates to games, and discloses a combination of a board and markers which will readily adhere to the board and which can be easily removed from the board. The board may have a glossy coating of polyvinyl chloride and the marker is provided with a glossy surface of, for instance, polyvinyl chloride or oilcloth.

U.S. Pat. No. 3,836,151 to Bowerman also discloses a game which comprises a panel together with a plurality of game playing pieces. The surface of the panel and of the playing pieces is of a common vinyl material and the playing pieces may, in one embodiment, have a symbol affixed to the upwardly facing surface. The symbol may be affixed by printing, stamping or other forms of embossing.

British Pat. No. 1581152 discloses a planning aid which comprises a panel having a self-adherent front surface to which a planning element having a smooth rear surface adheres when pressed thereon. The planning element may be in the form of a plastic coated cardboard piece; alternatively, the planning element may be provided with a strip of smooth self-adherent foil.

A multi-layer article which is available on the market has a self-adhesive polyvinyl chloride layer which is not highly plasticized. The article is supplied on a release paper and, when it is desired to be used, the release paper is peeled off to reveal the adhesive surface. The adhesive surface very quickly clogs with dust and permanently looses its adhesive qualities.

According to one aspect of the present invention there is provided an article comprising a plurality of layers, which is suitable to adhere to a smooth, high gloss surface, and which includes:

a first layer formed from a polished, highly plasticized polyvinyl chloride material and intended to adhere to the said surface; and a second layer formed of a padding material to give the article a padded appearance.

The article in accordance with the present invention will be known by the applicants by the trade mark "CLINGBACK".

The highly plasticized polyvinyl chloride can be that which is commercially available, e.g. that known as "Clearweystick" as supplied by Display People, of Shepton Mallet, Somerset, United Kingdom.

The articles of the present invention can adhere to any smooth, high gloss surface. The surface may, for example, be a plastics material or glass. When glass is the surface, the articles may, for example, be used by children on windows in their home or school.

The padding material may conveniently be a foam material or a wadding. The presently preferred foam material is polyvinyl chloride foam material, but other foam materials such as polyether foam material or polyurethane foam material may be used. If the padding material is a wadding, the wadding is preferably formed from polyvinyl chloride fibres, which may be in the form of a felt-like mat.

It is to be appreciated that the padding will give the article a more "three dimensional" appearance, as viewed from the front. The rearmost layer should be flat when the article is to adhere to a flat surface.

In one embodiment of the present invention, the article comprises five layer which are, sequentially:

(a) a layer of polished, highly plasticized polyvinyl chloride material;
(b) a layer of a polyvinyl chloride material;
(c) a layer of a rigid polyvinyl chloride material;
(d) a layer of a polyvinyl chloride foam material; and
(e) a layer of polyvinyl chloride material.

The layers (a), (b), and (e) may be coloured.

Suitable dimensions, given merely by way of example, in this embodiment are as follows:

| | |
|---|---|
| (a) 0.2 mm | (0.008 inch) |
| (b) 0.2 mm | (0.008 inch) |
| (c) 0.375 mm | (0.015 inch) |
| (d) 2.5 mm | (0.1 inch) |
| (e) 0.2 mm | (0.008 inch) |

In another embodiment of the present invention, the layers (b) and (c) may be replaced by a single layer of rigid, polyvinyl chloride material.

In a further embodiment, the article comprises three layers which are, sequentially:

(a) a layer of polished, highly plasticized polyvinyl chloride material;
(b) a layer of a polyvinyl chloride foam material; and
(c) a layer of rigid or semi-rigid polyvinyl chloride material.

In another embodiment of the present invention, the layer most remote from the highly plasticized layer is a layer of a self-adhesive polyvinyl chloride material. One or more of the article may then be permanently attached to the outer surface of a 3-dimensional shape or body to give the shape or body a padded appearance and to impart a highly plasticized quality to the outer surface of the shape. Thus, for example, a rectangular, expanded polyurethane block may be provided, on its surface, with one or more of the multi-layer articles having the self-adhesive layer. The outer layer of the block will adhere to the outer layer of similar blocks, as well as other smooth, high gloss surfaces, and enables blocks to be utilised as, for example, childrens building blocks.

Although the layer most remote from the highly plasticized polyvinyl chloride may be continuously coloured, it may alternatively be a clear layer with printing, in one or more different coloured inks, on the side of this remote layer which faces an intermediate layer of the article.

Articles produced in accordance with the present invention may be in the shape of an alphanumeric character.

Alternatively, the article may be in the shape of an easily recognisable object which can be used as an alphabet teaching aid (for example, an apple-shaped article corresponding to the letter a, a bee-shaped article corresponding to the letter b, etc. for use with the English language; or the suitable equivalents in other languages).

In another alternative form the article may be a geometric shape, for example a circle, a rectangle, a triangle or any other curved or straight sided outline, which can be used to form pictures and patterns.

The article may, for example resemble a road traffic sign, which can be used as a teaching aid (for example, for the road safety instruction of young children).

In another aspect of the present invention, there is provided a combination comprising one or more articles in accordance with the first-mentioned aspect of the present invention, in association with a substrate having a smooth, high gloss surface. This surface must be substantially grease-free for the article to adhere satisfactorily to the surface.

Thus, printed representational shapes may be used in conjunction with a printed background board to make scenes, for example farmyard, seaside, space or street scenes.

Additionally, articles in the form of numerals may be used in association with a printed circular board, having a smooth high gloss surface, as a clock face, for a time-teaching aid.

In one embodiment of this aspect of the present invention the substrate with the high gloss surface is in the form of a childrens' height measuring chart, and the one or more article is chosen from a marker and a marker printed with an appropriate name.

In another embodiment of this aspect of the present invention, the substrate with the high gloss surface may be printed with a music stave and the articles are in the shape of musical notes (for example crotchets or minims).

Other combinations which are considered by the applicants, but which are not intended to limit the applications of the present invention are as follows:

the substrate being printed as an alphabet or number frieze to which articles of the present invention in the shape of the letters or numbers may be affixed as an educational aid to children;

the substrate being printed as a blank face with the articles being shaped and printed to represent facial features (e.g. eyes, noses, lips, etc.);

the substrate being printed as a weather chart and the articles shaped and printed to represent different weather conditions (e.g. clouds, sun, snowflakes, etc.); and the substrate being printed as a background landscape and the articles being shaped and printed to represent architectural elements of various buildings, (e.g. church, garage, high rise blocks, etc.).

In a further aspect of the present invention, there is provided a process for producing an article in accordance with the first-mentioned aspect of the present invention, which process comprises passing a plurality of layers, from which the article is to be formed, between a pair of platens and, by a high frequency welding technique, pressing the desired shape of article from the plurality of layers.

For an article wherein the layer most remote from the highly plasticized layer is clear with printing on the side of the remote layer which faces an intermediate layer, the weld may surprisingly be made through the ink, thus not giving a wide border to the article.

DETAILED DESCRIPTION OF THE DRAWINGS

Figure 1:
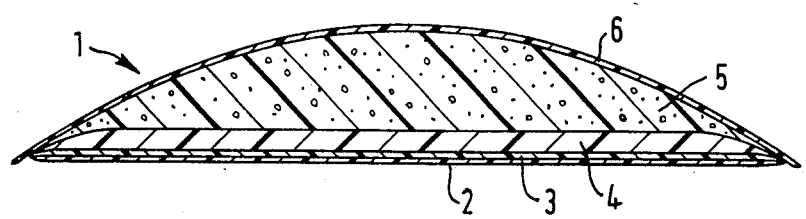
FIG. 1 shows a cross-section through the middle region of an article in accordance with one embodiment of the present invention.

Referring to FIG. 1, the article comprises five layers, 2, 3, 4, 5 and 6 which are, respectively, (a) a layer of polished highly plasticized polyvinyl chloride material:
(b) a layer of polyvinyl chloride material;
(c) a layer of a rigid polyvinyl chloride material;
(d) a layer of a polyvinyl chloride foam material; and
(e) a layer of a polyvinyl chloride material.

The layers (a), (b) and (e) may be coloured.

Figure 2:
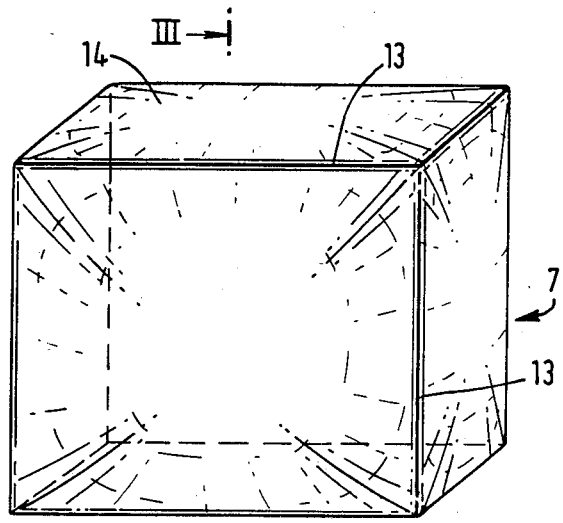
FIG. 2 shows a cubic playbrick having a padded appearance and a highly plasticized surface layer.
Figure 3:
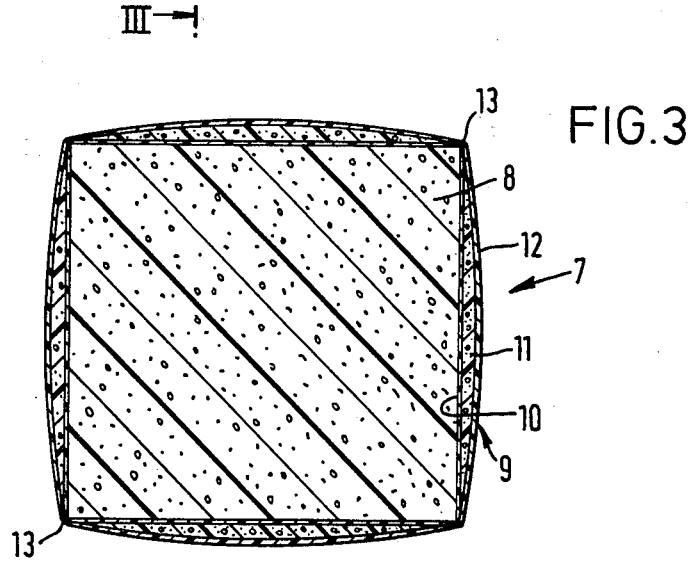
FIG. 3 shows the cross-section III—III of FIG. 2.

With reference to FIG. 2, a cubic playbrick 7 is shown; as will be appreciated, instead of being cubic the playbrick may be any 3-dimensional faced shape. FIG. 3 shows a cross-section looking in the direction III—III; the body 8 of the playbrick 7 may be formed from expanded polyurethane to give the playbrick 7 a "soft", spongy feel. It is to be appreciated, however, that the body 8 could be formed from other soft, spongy materials or materials not having a "soft" feel, such as wood. The body 8 of the playbrick 7 has affixed to its surface an outer portion 9 which corresponds to the multi-layer article of the present invention. The outer portion, in the embodiment illustrated, comprises: a layer of self-adhesive polyvinyl chloride 10 which causes the outer portion 9 to adhere to the body 8 of the playbrick 7; an intermediate layer 11 formed of a polyvinyl chloride foam material; and an outer layer 12 of polished highly plasticized polyvinyl chloride. At the edges 13 of the playbrick 7, the outer portion 9 is welded together, the process to effect the welding being, for example, well known high frequency welding.

Each face 14 of the playbrick 7 may be covered by a separate multi-layer article. Alternatively, the outer portion 9 for the whole playbrick 7 may be prepared as a single multi-layer article.

Figure 4:
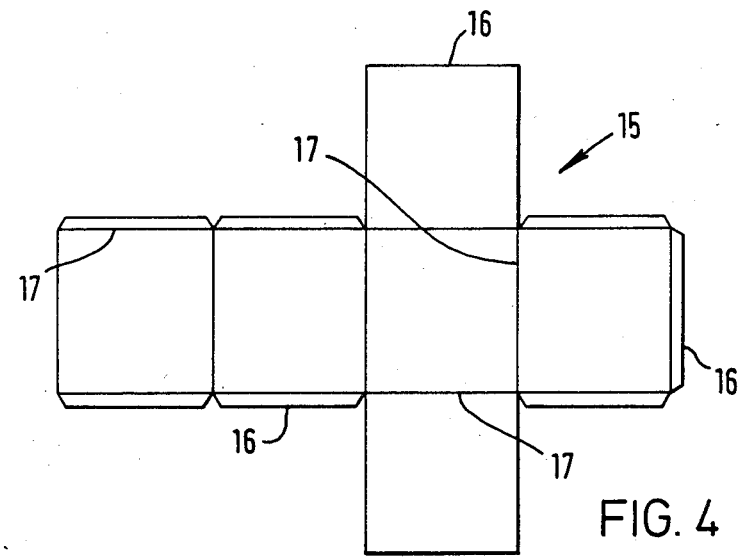
FIG. 4 shows the multi-layered, padded outer portion of the cubic playbrick of FIG. 2.

In FIG. 4, such a single multi-layer article 15 is shown. At all the edges 16 and along the crease lines 17, the layers of the article 15 are welded. The article 15 will then fold neatly around the body 8, with the self-adhesive polyvinyl chloride sticking the article to the body. Tabs may be provided to ensure neat edges of the playbrick 7 and the finished playbrick 7 will have a padded appearance and glossy surface. The playbricks 7 can be used by children as building blocks and possess the advantage that they stick together. In common with the multi-layer articles of this invention the surfaces of the bricks are washable to regain their "sticking" properties after prolonged use when the surface may pick up dust and dirt.

The surfaces 14 of a playbrick 7 may be printed with, for example, alphanumeric characters, symbols, or other indicia. If such a playbrick 7 is intended as an educational aid, one surface could be printed with a capital letter, e.g. A, another surface with the same letter in lower case, e.g. a, and a third face could be printed with a picture of an object the spelling of which begins with the same letter, e.g. apple.

The printing would conveniently be a printed layer on the underside of the outer layer 12 of polished, highly plasticized polyvinyl chloride.

Figure 5:
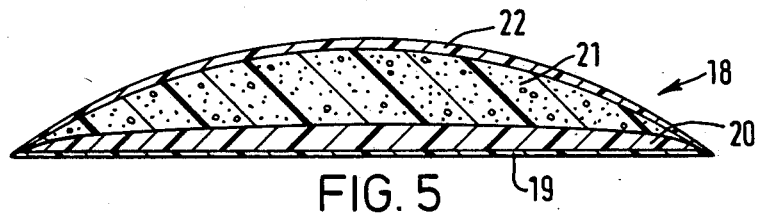
FIG. 5 shows a cross-section through the middle region of an article in accordance with another embodiment of the present invention.

With reference to FIG. 5, an article 18 having four layers 19, 20, 21 and 22 is shown. The layers are, sequentially:

(a) a layer of polished highly plasticized polyvinyl chloride material 19;
(b) a layer of rigid, polyvinyl chloride material 20;
(c) a layer of polyvinyl chloride foam material 21; and
(d) a layer of polyvinyl chloride material.

The article 18 is frequency-welded along its edges and it is the layer of polished, highly plasticized polyvinyl chloride material 19 which will adhere to a smooth, high gloss surface, e.g. glass.

Figure 6:
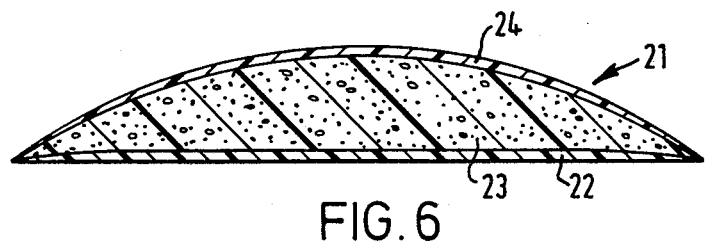
FIG. 6 shows a cross-section through the middle region of an article in accordance with yet another embodiment of the invention.

With reference to FIG. 6, an article 21 having three layers, 22, 23 and 24 is shown. The layers are, sequentially:

(a) a layer of polished, highly plasticized polyvinyl chloride material 22;
(b) a layer of polyvinyl chloride foam material 23; and
(c) a layer of rigid or semi-rigid polyvinyl chloride material.

The invention has been described in detail with particular emphasis on the preferred embodiments, but it should be understood that variations and modifications within the spirit and scope of the invention may occur to those skilled in the art to which the invention pertains.

We claim:

1. An article, which is suitable to adhere to a smooth, high gloss surface, comprising:
   a lower layer formed from a polished, highly plasticized polyvinyl chloride material and intended to adhere to the said surface;
   an intermediate layer formed of a padding material to give the article a padded appearance; and
   an upper layer of a polyvinyl chloride material;
   the upper and lower layers being secured together at least along their peripheral edge regions to enclose the intermediate layer therebetween.

2. An article according to claim 1, comprising at least one further intermediate layer enclosed between the upper and lower layers.

3. An article, which is suitable to adhere to a smooth, high gloss surface, comprising at least four layers which are:
   a lower layer formed from a polished, highly plasticized polyvinyl chloride material and intended to adhere to the said surface;
   a first intermediate layer of a rigid polyvinyl chloride material;
   a second intermediate layer of a padding material to give the article a padded appearance; and
   an upper layer of a polyvinyl chloride material;
   the upper and lower layers being secured together at least along their peripheral edge regions to enclose the intermediate layers therebetween.

4. An article according to claim 3, further comprising a third intermediate layer of a polyvinyl chloride material situated between the lower layer and the first intermediate layer.

5. An article, which is suitable to adhere to a smooth, high gloss surface, comprising four layers which are, sequentially:
   (a) a lower layer formed from a polished, highly plasticized polyvinyl chloride material and intended to adhere to said surface;
   (b) an intermediate layer of a rigid polyvinyl chloride material;
   (c) an intermediate layer of a polyvinyl chloride foam material; and
   (d) an upper layer of polyvinyl chloride material;
   wherein the lower and upper layers are secured together at least along their peripheral edge regions to enclose the intermediate layers therebetween.

6. An article, which is suitable to adhere to a smooth, high gloss surface, comprising five layers which are, sequentially:
   (a) a lower layer formed from a polished, highly plasticized polyvinyl chloride material and intended to adhere to said surface;
   (b) an intermediate layer of a polyvinyl chloride material;
   (c) an intermediate layer of a rigid polyvinyl chloride material;
   (d) an intermediate layer of a polyvinyl chloride foam material; and
   (e) an upper layer of polyvinyl chloride material;
   wherein the lower and upper layers are secured together at least along their peripheral edge regions to enclose the intermediate layers therebetween.

7. A combination comprising:
   (a) a substrate having a smooth high gloss surface; and
   (b) an article, which is suitable to adhere to a smooth, high gloss surface, comprising:
   a lower layer formed from a polished, highly plasticized polyvinyl chloride material and intended to adhere to the said surface;
   an intermediate layer formed of a padding material to give the article a padded appearance; and
   an upper layer of a polyvinyl chloride material;
   the upper and lower layers being secured together at least along their peripheral edge regions to enclose the intermediate layer therebetween.

8. An article which comprises a body portion defining faces, and, on the faces of the body portion, a layered element, the layered element comprising, sequentially, a layer of polished, highly plasticized polyvinly chloride material and a layer of self-adhesive polyvinyl chloride material and a layer of self-adhesive polyvinyl chloride material, the layer of polished, highly plasticized polyvinyl chloride material and the layer of self-adhesive polyvinyl chloride material being secured together at least along their peripheral edge regions to enclose an intermediate layer of padding material therebetween;
   wherein the layer of self-adhesive polyvinyl chloride material bonds the layered element to the body, and the polished, highly plasticized polyvinyl chloride material faces outwards.

9. An article according to claim 1, wherein the padding material is a foam material.

10. An article according to claim 2, wherein the foam material is selected from the group consisting of a polyvinyl chloride foam material and a polyurethane foam material.

11. An article according to claim 1, wherein the padding material is a wadding.

12. An article according to claim 11, wherein the wadding is in the form of polyvinyl chloride fibres.

13. An article according to claim 8, wherein said outer layer is continuously coloured.

14. An article according to claim 8, wherein said outer layer is a clear layer with printing, in a coloured ink or in more than one different coloured inks, on that side of the outer layer which faces the intermediate layer formed of a padding material.

15. A combination according to claim 7, wherein the padding material of the article is a foam material.

16. A combination according to claim 15, wherein the foam material is selected from the group consisting of a polyvinyl chloride foam material and a polyurethane foam material.

17. A combination according to claim 7, wherein the padding material of the article is a wadding.

18. A combination according to claim 17, wherein the wadding is in the form of polyvinyl chloride fibres.

19. An article according ot claim 8, wherein the body portion is formed from expanded polyurethane.

20. An article according to claim 8, wherein the layered element is provided with creases which allow the layered element to be folded around the body, said creases being formed by a high frequency welding technique.

* * * * *